(12) United States Patent  
Chajed et al.

(10) Patent No.: US 9,171,203 B2  
(45) Date of Patent: Oct. 27, 2015

(54) SCANBOX

(71) Applicant: Dropbox, Inc., San Francisco, CA (US)

(72) Inventors: Tej Chajed, Champaign, IL (US); Peter Welinder, San Francisco, CA (US); Boris Babekno, San Mateo, CA (US); Dimitar Simeonov, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 0 days.

(21) Appl. No.: 14/022,933

(22) Filed: Sep. 10, 2013

(65) Prior Publication Data

US 2015/0071549 A1 Mar. 12, 2015

(51) Int. Cl.
*G06K 9/48* (2006.01)
*G06K 9/00* (2006.01)
*G06K 9/46* (2006.01)
*G06T 7/00* (2006.01)

(52) U.S. Cl.
CPC .......... *G06K 9/00456* (2013.01); *G06K 9/4633* (2013.01); *G06T 7/0085* (2013.01); *G06K 9/48* (2013.01); *G06T 2207/20061* (2013.01)

(58) Field of Classification Search
CPC .... H04N 1/1446; H04N 13/0431; G06T 9/00; G06T 2207/10008; G06T 2207/20136; G06T 2207/30176; G06T 7/0083; G03B 35/18; A61B 8/483; G06K 7/1456; G06K 9/00805; G06K 9/6292; G06K 9/6202; G06K 9/00483; G06K 9/723; B60R 21/0134; G06F 17/30265; G06F 17/30247; G06F 21/78; G06F 21/80; G09G 2358/00; G09G 2370/027

USPC ......... 382/199, 237, 242, 266, 137–140, 232, 382/181, 209, 112

See application file for complete search history.

(56) References Cited

U.S. PATENT DOCUMENTS

| | | | | |
|---|---|---|---|---|
| 4,648,119 A | * | 3/1987 | Wingfield et al. | 382/243 |
| 4,985,863 A | * | 1/1991 | Fujisawa et al. | 1/1 |
| 5,226,175 A | * | 7/1993 | Deutsch et al. | 345/419 |
| 5,506,918 A | * | 4/1996 | Ishitani | 382/289 |
| 5,586,196 A | * | 12/1996 | Sussman | 382/114 |

(Continued)

OTHER PUBLICATIONS

Jianying Hu; Kashi, R.; Wilfong, G., "Document Image Layout Comparison and Classification"; Proceedings of the Fifth International Conference on Document Analysis and Recognition. ICDAR '99 (Cat. No. PR00318), 285-8, 1999; ISBN-10: 0 7695 0318 7; DOI: 10.1109/ICDAR.1999.791780; Conference: Proceedings of the Fifth International Conference on Document Analysis and Recognition, Sep. 20-22, 1999, Bangalore, India; Sponsor: Int. Assoc. for Pattern Recognition; Publisher: IEEE Comput. Soc, Los Alamitos, CA, USA.

(Continued)

*Primary Examiner* — Vu Le
*Assistant Examiner* — Aklilu Woldemariam
(74) *Attorney, Agent, or Firm* — Keller Jolley Preece

(57) ABSTRACT

Embodiments are provided for content item classification. In some embodiments, an image for classification is received, a compact representation for the image having values indicative of pixel values within the received image is generated, a plurality of angle measurements for possible edges of at least one potential document within the received image are determined, and the image is classified using said compact representation and said plurality of angle measurements.

21 Claims, 13 Drawing Sheets

(56) References Cited

U.S. PATENT DOCUMENTS

| | | | |
|---|---|---|---|
| 5,818,976 A * | 10/1998 | Pasco et al. | 382/289 |
| 5,995,671 A * | 11/1999 | Nagarajan et al. | 382/242 |
| 6,430,320 B1 * | 8/2002 | Jia et al. | 382/289 |
| 6,785,405 B2 | 8/2004 | Tuttle et al. | |
| 6,816,277 B2 | 11/2004 | Kaltenecker et al. | |
| 7,116,448 B1 * | 10/2006 | Fujiwara | 358/3.2 |
| 7,302,004 B2 * | 11/2007 | Zhang et al. | 375/240.16 |
| 7,949,176 B2 * | 5/2011 | Nepomniachtchi | 382/137 |
| 7,978,365 B2 | 7/2011 | Nabeshima | |
| 8,194,933 B2 | 6/2012 | Lei et al. | |
| 8,284,985 B2 | 10/2012 | Charpentier | |
| 8,290,272 B2 | 10/2012 | Filimonova et al. | |
| 8,559,748 B2 * | 10/2013 | Banerjee et al. | 382/266 |
| 2002/0020747 A1 * | 2/2002 | Wakamiya et al. | 235/462.11 |
| 2002/0054335 A1 * | 5/2002 | Sekiguchi | 358/1.15 |
| 2004/0057619 A1 * | 3/2004 | Lim et al. | 382/182 |
| 2005/0105608 A1 * | 5/2005 | Coleman et al. | 375/240.01 |
| 2005/0147170 A1 * | 7/2005 | Zhang et al. | 375/240.16 |
| 2007/0143272 A1 * | 6/2007 | Kobayashi | 707/3 |
| 2008/0002555 A1 | 1/2008 | Hayasaka et al. | |
| 2008/0267510 A1 | 10/2008 | Paul et al. | |
| 2009/0152357 A1 | 6/2009 | Lei et al. | |
| 2009/0316996 A1 * | 12/2009 | Yokoi | 382/199 |
| 2011/0033114 A1 * | 2/2011 | Konno | 382/190 |
| 2011/0103699 A1 * | 5/2011 | Ke et al. | 382/209 |
| 2011/0153515 A1 | 6/2011 | Pitzo et al. | |
| 2012/0106844 A1 * | 5/2012 | Ramachandrula et al. | 382/173 |
| 2012/0113489 A1 | 5/2012 | Heit et al. | |
| 2012/0218284 A1 * | 8/2012 | Yager et al. | 345/589 |
| 2013/0188876 A1 * | 7/2013 | Demandolx et al. | 382/199 |

OTHER PUBLICATIONS

Erol, B.; Hull, J.J., "Semantic classification of business images", Proceedings of the SPIE—The International Society for Optical Engineering, v 6073, 60730G-1-8; Jan. 15, 2006; ISSN: 0277-786X; DOI: 10.1117/12.643463; Conference: Multimedia Content Analysis, Management, and Retrieval 2006, Jan. 17, 2006, San Jose, CA, USA; Publisher: SPIE—The International Society for Optical Engineering, USA.

* cited by examiner

SCANBOX

FIELD OF THE INVENTION

Various embodiments relate generally to classifying content items.

BACKGROUND

Technological advancement with digital cameras in recent years has both reduced the size and the cost of digital cameras. Digital cameras are largely mass produced in a large number of electronic devices, such as pocket-sized cameras, mobile phones, computers, tablets, and other devices. Users often have a camera at their disposal and may snap a photograph of a document rather than write down the contents of the document. As a result, users may over time accumulate a large number of images that contain documents.

With the decrease in costs for storage, users often store a large number of their captured images both on their cameras and in remote storage. Instead of reviewing and organizing images before uploading, users simply upload the entire set to content management systems to store, manage, and review their captured images. With images that contain documents mixed with other images, it can be difficult to find a particular image with a document. Accordingly, there is a need for improved image classification and organization of images.

SUMMARY

Embodiments are provided for content item classification. In some embodiments, an image for classification is received, a compact representation for the image having values indicative of pixel values within the received image is generated, a plurality of angle measurements for possible edges of at least one potential document within the received image are determined, and the image is classified using said compact representation and said plurality of angle measurements.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Methods, systems, and computer readable mediums for content item classification are presented. Content items may be uploaded to a content management system and may be classified, indexed, and/or organized. In particular, images may be automatically identified as containing a document without requiring a user to explicitly designate the image as containing a document. The image may be rectified to improve display of the document, and optionally, the images may be further classified as containing a particular type of document.

For purposes of description and simplicity, methods, systems and computer readable mediums will be described for a content storage and management service, and in particular, content item classification. However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described may be used for a variety of storage providers/services and types of content, files, portions of files, and/or other types of data.

Figure 1:
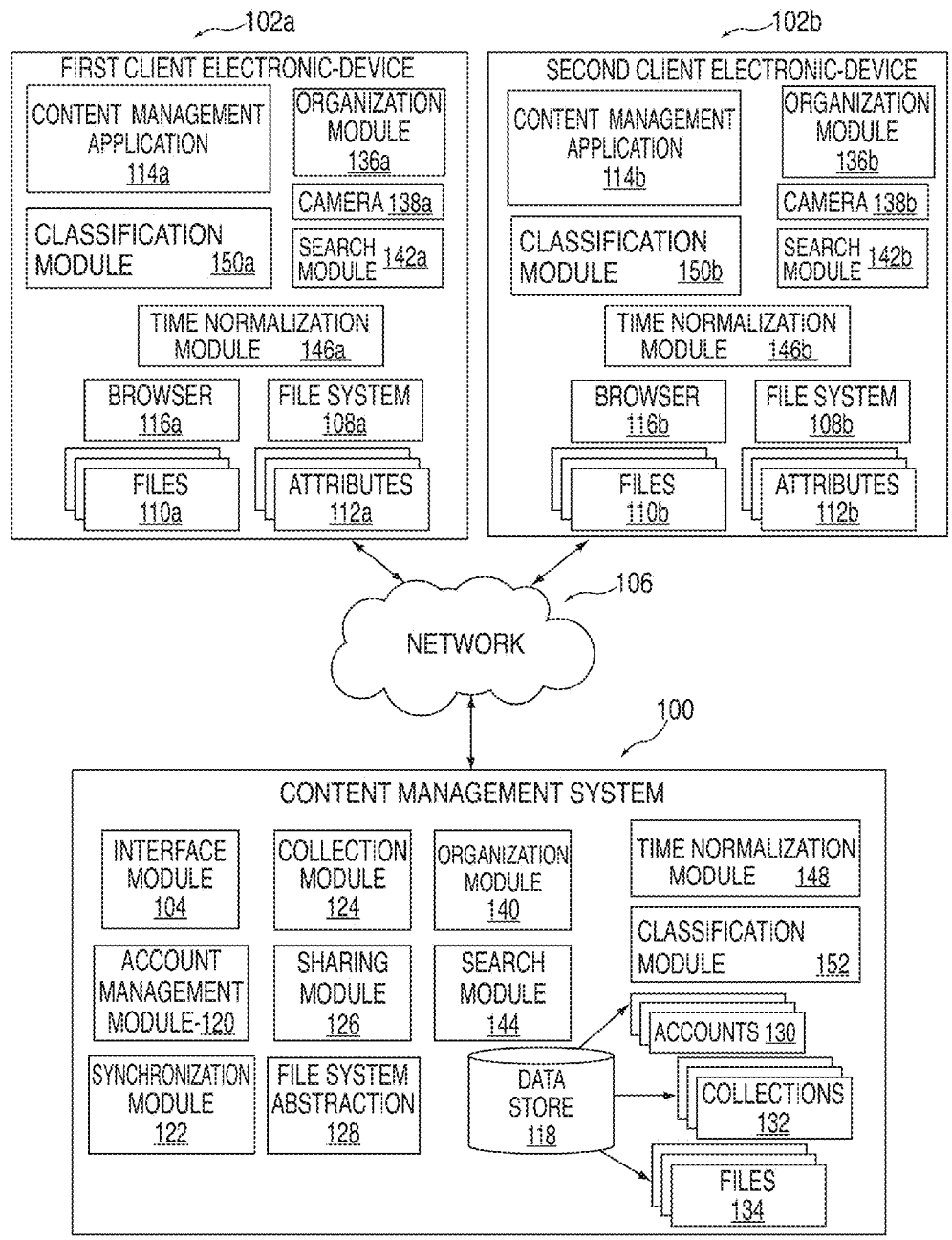
FIG. 1 is an exemplary content management system which can be used to perform content item classification in accordance with some embodiments of the invention.

FIG. 1 is an exemplary content management system which can be used to perform content item classification in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard. Metadata may include, but is not limited to, the following: creation time timestamp, geolocation, orientation, rotation, title, and/or any other attributes or data relevant to the captured image.

A time normalization module 146 (e.g., 146a and 146b) may be used to normalize dates and times stored with a content item. An example of time normalization is provided in U.S. Provisional Patent Application No. 61/801,318, entitled "Date and Time Handling," filed on Mar. 15, 2013, and herein incorporated by reference in its entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. Provisional Patent Application No. 61/794,184, entitled "Presentation and Organization of Content," filed on Mar. 15, 2013, and herein incorporated by reference in its entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

Classification module 150a and/or 150b (collectively 150) may be used independently, in combination with classification module 152, and/or any combination thereof to classify images, rectify images, and/or classify documents. For example, the classification module 150 and/or 152 may be used to determine if an image contains a document, and if there is a document, determine a type of document stored. Images rectification may be performed to correct, perform further transformations, and/or crop the image to improve the display of the image (e.g., correct the display of the document within the image).

A search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item and/or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. The sharing can be performed in a platform independent manner. That is, the content can be shared across multiple client devices 102 of varying type, capabilities, operating systems, etc. The content can also be shared across varying types of user accounts. In particular, the sharing module 126 can be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is described in provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item can be designated as part of the virtual collection without having to store (e.g., copy and paste the content item file to a directory) the content item in another location within data storage in order to place the content item in the collection.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2:
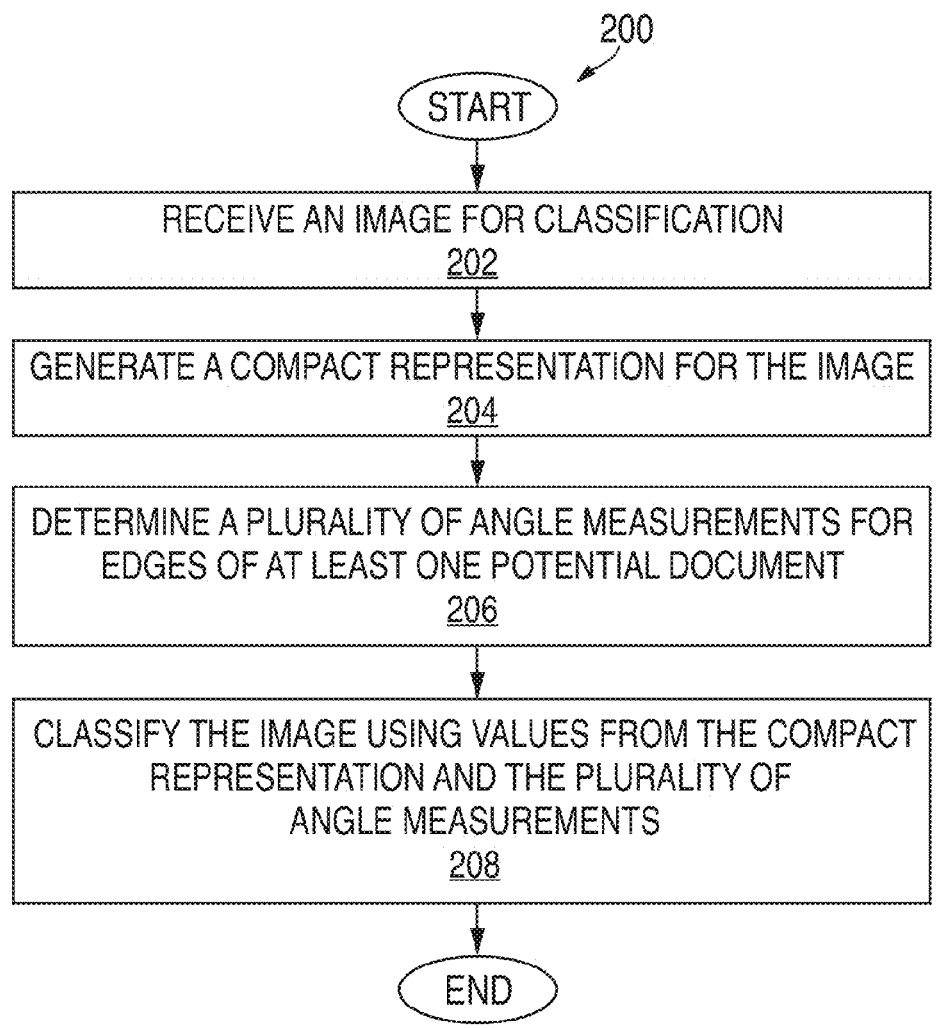
FIG. 2 is an exemplary flowchart for content item classification in accordance with some embodiments of the invention.

FIG. 2 is an exemplary flowchart 200 for content item classification in accordance with some embodiments of the invention. An image may be received for classification (202). The image may be captured and recorded with a camera, such as camera 138 of client device 102a, and received on device 102a. Images may also be received via email, text message, any other type of communication, and/or uploaded from client device 102a to content management system 100. In some embodiments, all received images or any subset of received images managed by content management system 100 may be checked for a potential document without the user having to explicitly designate the image as containing a captured document. In other embodiments, the received image may be designated as containing a document (e.g., via the user interface) and content item classification may be used to validate whether the document contains a document. The user may additionally request via the user interface that particular images be checked for containing a document.

The received image may be a digital image having a numeric representation. The digital image may have a finite set of pixels (e.g., rows and columns of pixels) to represent the image, and each pixel may have a quantized value for the brightness of a specific color and/or luminance at a particular point. For example, the digital image may have pixels with quantized values for color channels red, green, and blue (RGB). In another example, the received image may be a black and white image (e.g., grayscale image). Although systems, methods, and computer readable mediums are described throughout this document for receipt of images that have an RGB representation, those with skill in the art will recognize that the image may be received in any other representation, such as Hue, Saturation, and Lightness (HSL), Hue, Saturation, Value (HSV), LUV (Luminance and chrominance parameters U and V) perceptual color space, and CMYK (Cyan, Magenta, Yellow, and Key) color model.

In some embodiments, the digital image may be captured and stored on device 102a as a compressed image. The image may be compressed using a compression algorithm, such as a Joint Photographic Expert Group (JPEG) compression algorithm, and the image may be stored in one or more compressed files. By way of example, during JPEG compression, the representation of the colors for the image may be converted from RGB to color channels $Y'C_BC_R$ for each pixel, consisting of one luma component (Y'), representing brightness, and two chroma components ($C_B$ and $C_R$) representing color.

A compact representation for the image may be generated (204). The compact representation generated may be a lossy compression and/or further compression of the received image. The received image may be downsampled from the set of pixels with RGB values, grayscale values, and/or compressed color channel values of the received image to form the compact representation with a reduced set of values indicative of values of pixels for the received image. For example, the compact representation may be values that are a subsample of the pixel values for the received image.

A set of sample areas may be selected from the received image, and the sample may be a pixel value from each sample area, an average of pixel values found in each sample area, and/or a weighted average for pixel values from each sample area that may be used as the values for the compact representation. By way of example, for a received 2048×1536 pixel image, the compact representation may be a subsample of the received pixel values, and the subsample may form a set of 10×10 pixel values indicative of the values from the received image.

In particular, the compact representation may be a grayscale digital image in which each pixel value is a single sample with intensity information for the corresponding RGB values for a corresponding pixel(s) from the digital image. The grayscale image may be composed of shades of gray, varying from black at the weakest intensity to white at the strongest, or vice versa. The intensity of the pixel may be within a range with a maximum and a minimum value (e.g., 0-99). For example, the luminance of the grayscale pixels may be matched to the luminance of the color channel luminance. By way of example, to convert a received RGB image to grayscale, the luminance may be calculated as a weighted sum of pixel values of the color channels, with $Y'=0.299R+0.587G+0.114B$.

A plurality of angle measurements may be determined for edges of at least one potential document within the received image (206). Any number of edge detection, feature extraction techniques, and/or other image analyses may be performed to determine edge candidates and edge points for a potential document within the image. An edge detector may optionally be used to locate potential edge candidates for a document and corresponding potential image points or pixels lying on or within edges of objects within the received image. For example, a Canny edge detector or any other edge detection operator may be used to locate potential edges and corresponding edge points within the image.

In another example, a Sobel operator may be used to perform spatial gradient measurements on points within an image to emphasize regions of high spatial frequency that may correspond to edges. In the application of the Sobel operator, a pair of convolution kernels may be applied horizontally and vertically on the image to produce separate measurements for the gradient a each point (e.g., Gx and Gy). The measurements may be combined to produce a magnitude of the gradient at each point as well as the orientation of the gradient. The magnitude for vector G may be determined using equation 2.0:

$$|G|=\sqrt{(Gx^2+Gy^2)}$$

and/or an approximate magnitude may be determined using equation 2.1:

$$|G|=|Gx|+|Gy|$$

Higher output values may indicate edges and the edge candidates may be used to determine if a document exists in the image. The angle of the gradient may be determined with gradient measurements from the Sobel operator using equation 2.2:

$$\Theta=\arctan(Gy/Gx).$$

By way of example, pseudocode for extracting the gradient magnitude and the angle of the gradient, can be as follows:

```
gradient_vertical,gradient_horizontal=vsobel(image),
    hsobel(image)

angles=mathLibrary.arctan 2(grad_v,grad_h)

magnitudes=mathLibrary.sqrt(grad_v*grad_v+grad_
    h*grad_h)
```

In some embodiments, a Hough transform feature extraction technique may be used to find the edges of an instance of a potential document within the received image. It is noted that a Hough transform technique groups image edge points into object candidates (e.g., edge candidates of document) by performing a voting procedure over a set of parameterized image objects (e.g., polar coordinates for edge point candidates). It is noted here that edge points for an edge of a document in the received image may not be in a perfectly straight line within the image. The voting procedure may indicate the most likely, or best hypothesis, for an edge of the document within the received image with the observed edge points. In the case of locating a potential document, edges (e.g., lines within the image) of the potential document may be located by applying a Hough transform. Image points (e.g., pixels) that are edge point candidates are considered in terms of the parameters for the line containing the candidate edge point. For example, each point (x, y) may be considered in terms of the slope parameter (m) and y-intercept parameter (b) for the line running through the point using the following equation 2.3:

$$y=mx+b$$

In another example, each point (x, y) may be considered in terms of polar coordinates (r, θ) describing the line from the origin running through the point (e.g., r=parameter for the distance between the line and the origin/pole and θ=parameter for the angle formed between a polar axis and the vector from the origin to the closest point on the line to the origin) using the following equation 2.4 for the line:

$$r=x\cos\theta+y\sin\theta$$

Figure 4A:
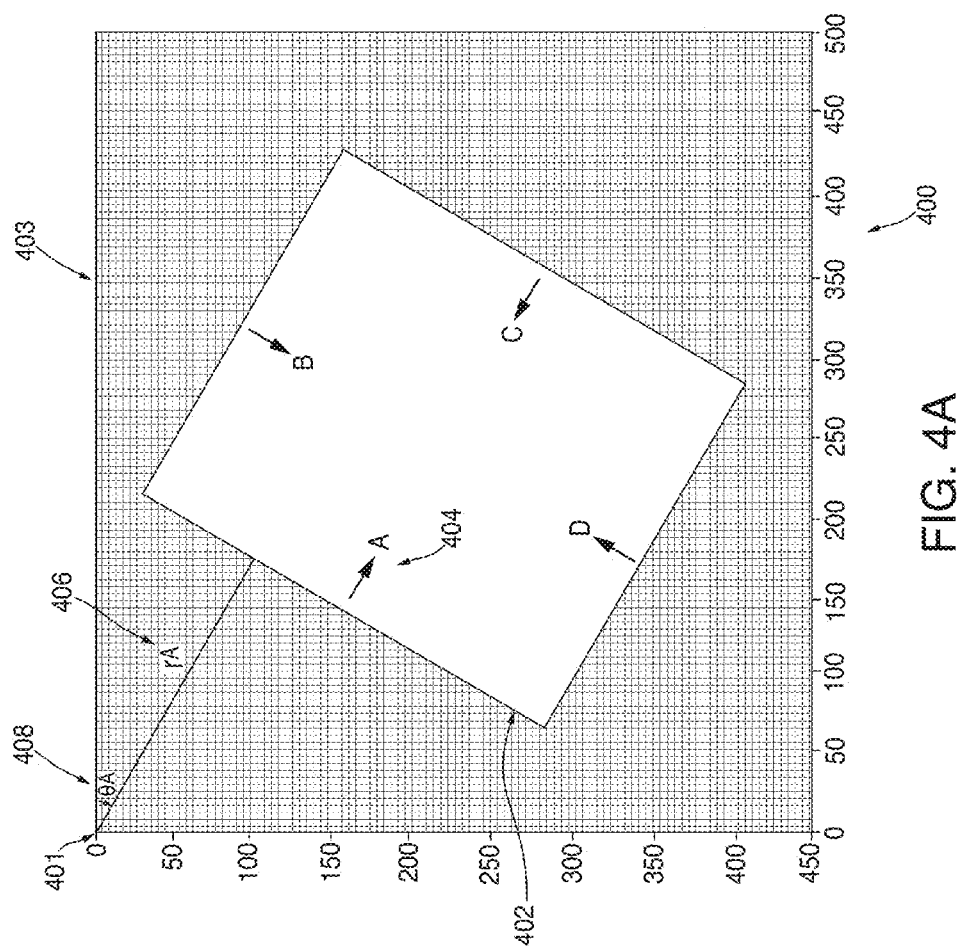
FIG. 4A illustrates an exemplary image for content item classification in accordance with some embodiments of the invention.

By way of example, FIG. 4A illustrates an exemplary image 400 for content item classification in accordance with some embodiments of the invention. As shown in FIG. 4A, parameters for an edge point candidate on line A 404 of potential document 402 are $\theta^A=30°$ (e.g., shown with 406) and $r^A=-200$ (e.g., shown with 408) with origin 401 and polar axis 403. In this example, $\theta^A$ is measured clockwise from the polar axis 403 to $r^A$. In other embodiments, the parameter for the angle (θ) may be measured counter clockwise. Continuing with the example, the value of the distance parameter r for the vector is negative to indicate that the vector is directed away from the direction of the gradient 404.

Figure 4B:
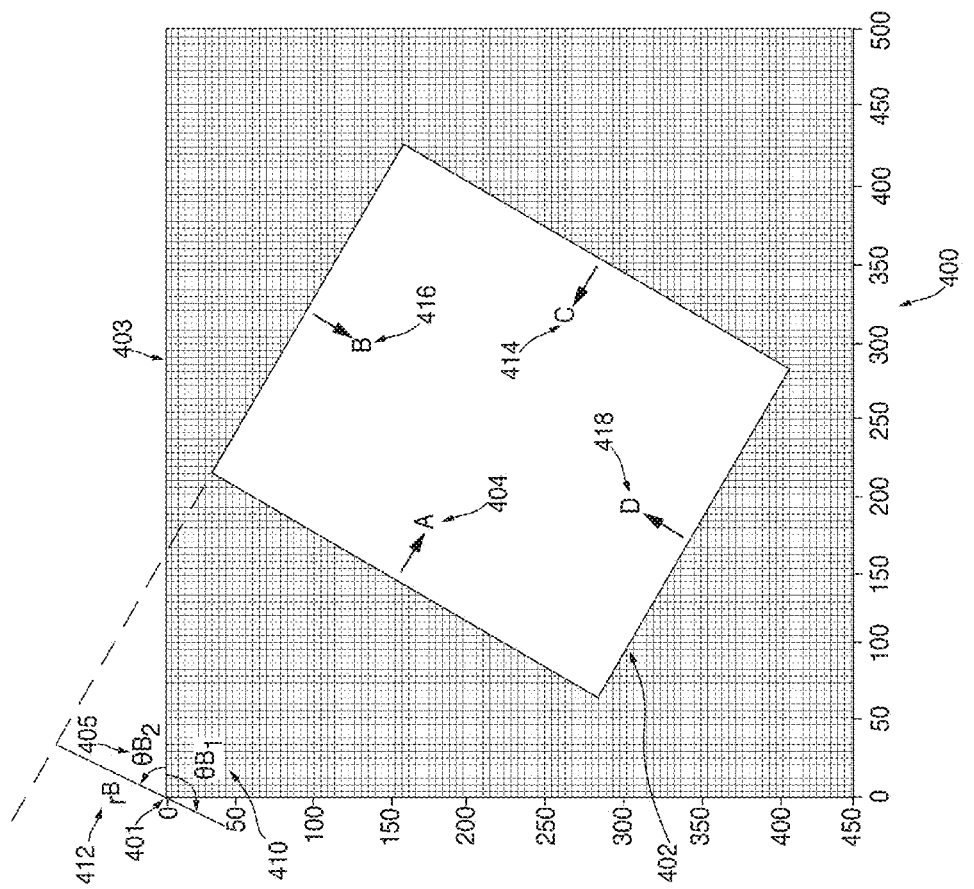
FIG. 4B illustrates an exemplary image for content item classification in accordance with some embodiments of the invention.
Figure 4C:
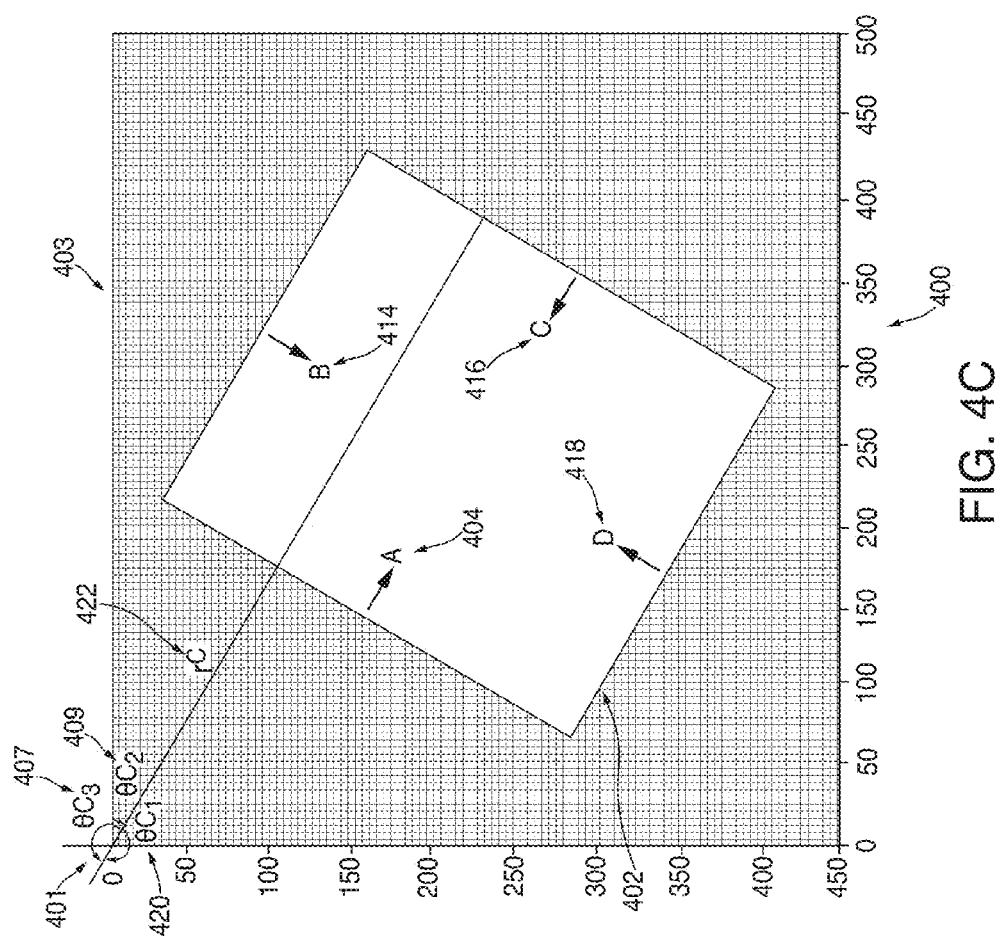
FIG. 4C illustrates an exemplary image for content item classification in accordance with some embodiments of the invention.
Figure 4D:
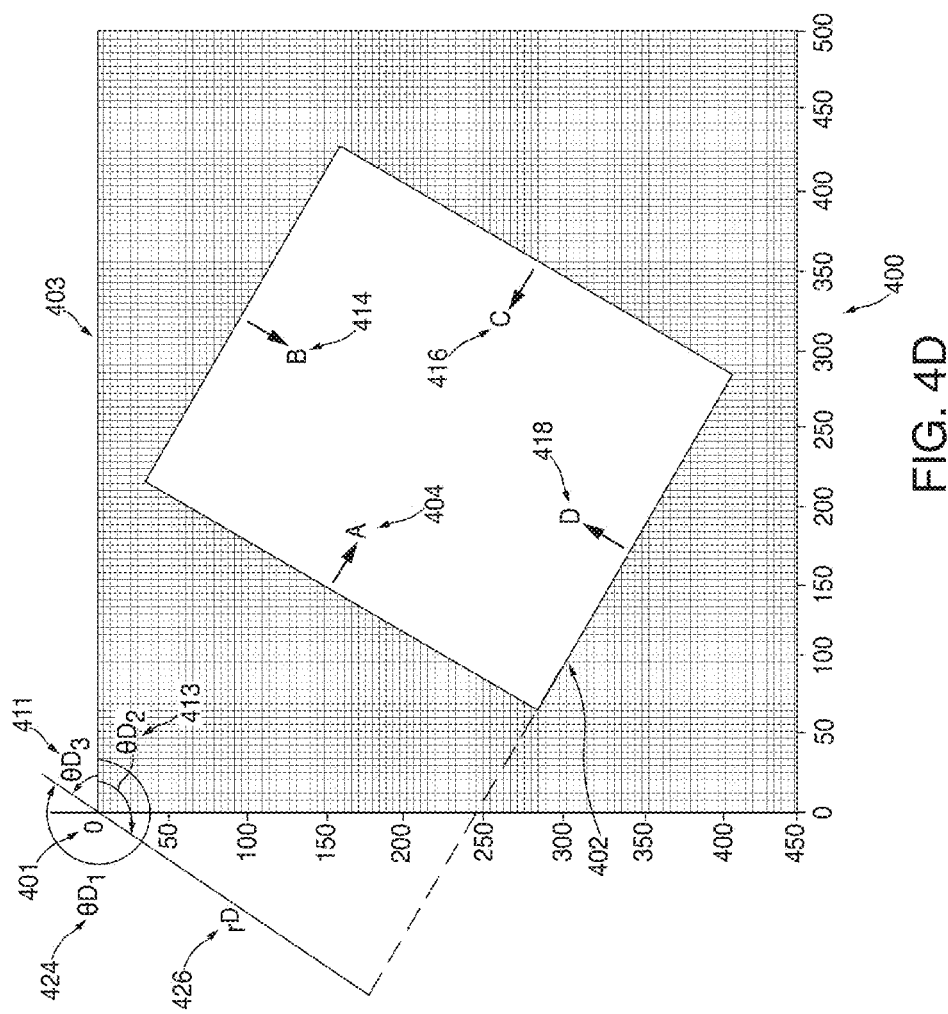
FIG. 4D illustrates an exemplary image for content item classification in accordance with some embodiments of the invention.

In another example, FIG. 4B illustrates the exemplary image 400 for content item classification in accordance with some embodiments of the invention. As shown in FIG. 4B, parameters for an edge point candidate on line B 414 for an edge of potential document 402 may be $\theta^{B1}=120°$ (e.g., shown with 410) and $r^B=100$ (e.g., shown with 412) with origin 401 and polar axis 403. Polar coordinates may have an infinite number of coordinates for any given point. For example, the angle (θ) for the edge point candidate may be defined by $\cos\theta=\cos(\theta+2\pi*n)$ where n is an integer ranging from 1→infinity. As such, by way of example, embodiments may define the parameter for the angle (θ) for the edge point candidate as $\theta^{B2}=-60°$ (e.g., shown with 405). Parameters for lines of edge points for line C 416 and line D 418 may similarly be determined using the Hough transform as shown in FIGS. 4C and 4D. As shown in FIG. 4C, parameters for an edge point candidate on line C 416 for an edge of potential document 402 may be $\theta^{C1}=210°$ (e.g., shown with 420) and $r^C=450$ (e.g., shown with 422) with origin 401 and polar axis 403. Embodiments may define the parameter for the angle (θ) for the edge point candidate as shown with $\theta^{C2}=30°$ (e.g., shown with 409) and/or $\theta^{C3}=-150°$ (e.g., shown with 407). As shown in FIG. 4D, parameters for an edge point candidate on line D 418 for an edge of potential document 402 are $\theta^{D1}=300°$ (e.g., shown with 424) and $r^D=250$ (e.g., shown with 426) with origin 401 and polar axis 403. Embodiments may define the parameter for the angle (θ) for the edge point candidate as shown with $\theta^{D2}=120°$ (e.g., shown with 413) and/or $\theta^{D3}=-60°$ (e.g., shown with 411).

In some embodiments, the angle parameter (θ) for a point may be the direction of the gradient for pixel values (e.g., as shown with the arrows next to lines A-D). The local gradient may be orthogonal to the edge. As shown, the gradient is pointing in the direction from a darker (lower) value to a brighter (higher) value within the image for each line. In some embodiments, potential edge candidates may be eliminated if the gradient is not consistently pointing a particular direction for each potential edge of the document. By way of example, if a document within the image contained a header line running across it, then the header could be eliminated as an edge of the document because there would be two opposing gradients for pixels (e.g., each away from the header). The (r) parameter may be determined using the value for the angle parameter (θ), as determined using equation 2.2, and equation 2.4. By way of example, pseudocode for computing (r) with equation 2.4 can be as follows:

```
r=X*mathLibrary.cos(angles)+Y*mathLibrary.sin
    (angles)
```

Figure 5A:
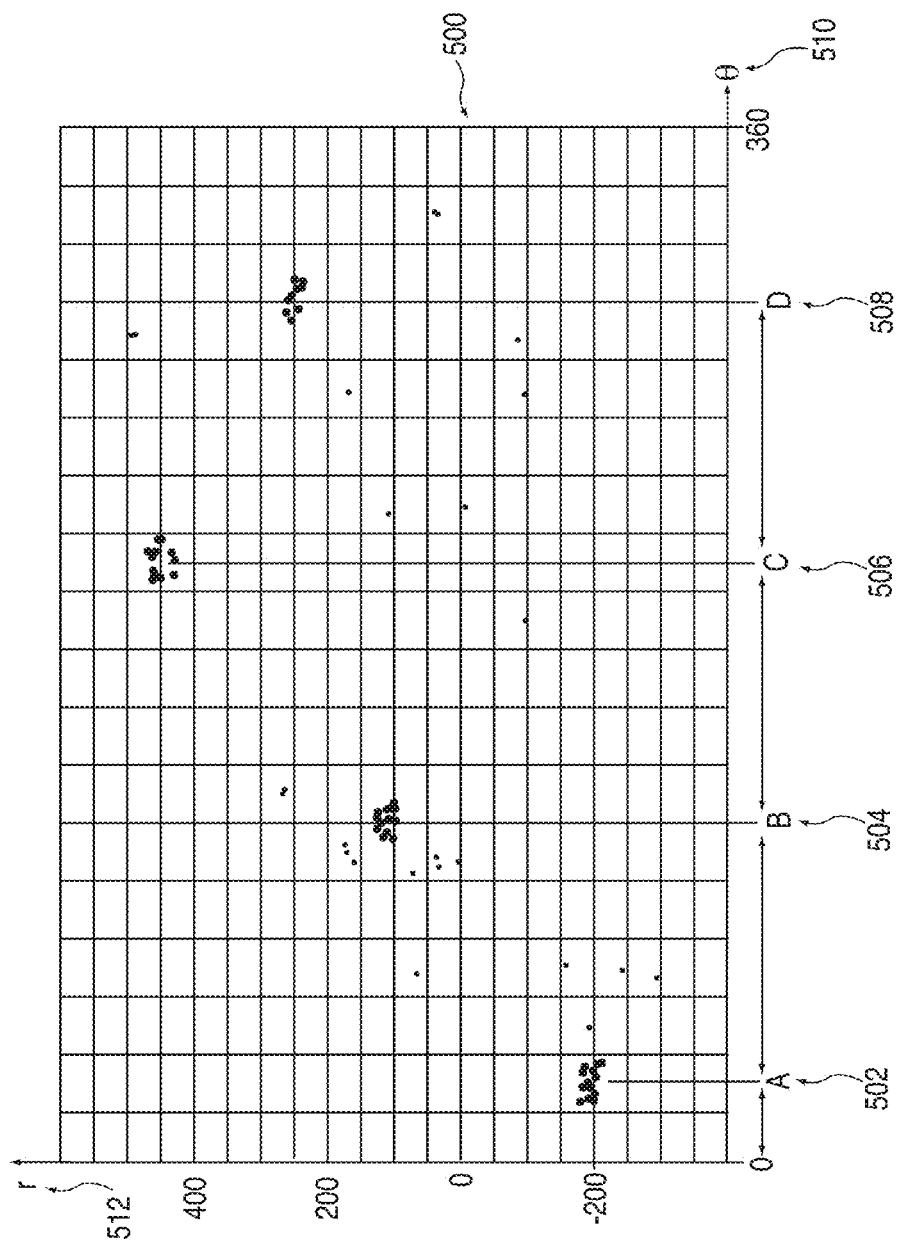
FIG. 5A illustrates an exemplary accumulator for content item classification in accordance with some embodiments of the invention.

After the parameter values are determined for the edge point candidates, a vote may be cast for each of such edge point candidates. An exemplary Hough transform algorithm may use, for example, an array and/or accumulator data structure to store the votes and determine the edges from the voting. FIG. 5A illustrates an exemplary accumulator 500 for identifying edges in a content item classification scheme in accordance with some embodiments of the invention. As shown in FIG. 5A, the dimensions of the accumulator are the angle parameter (θ) 510 and the distance parameter (r) specifying the distance between the line and the origin 512.

Votes are cast for each point by increasing the value for the polar coordinates of the point of the accumulator 500 for the corresponding parameters as shown in FIG. 5A. Increasing the value for particular polar coordinates of the point may be thought of as casting a vote or selecting a bin within the accumulator 500 for each point. In some embodiments, the magnitude of the gradient (e.g., rate of increase from higher value to a lower value) may be used as a factor for weighting the votes for a particular point. For example, if the rate of increase is significant at a particular point or area containing the point, then the votes may be adjusted to reflect the magnitude of the gradient. By weighting the votes, noise may be removed and clear peaks may be shown in a histogram with the data values.

As shown in accumulator 500, the bins with the highest values (e.g., labeled line A 502, line B 504, line C 506, and line D 508) indicate which lines are most represented in the image and are more likely to be edges of an object. The number of votes for a particular edge line candidate may need to be above a particular threshold to be considered the edge of a potential document. For a potential document, angle measurement values between edges are more likely to differ by nearly and/or exactly 90°. In the depicted example of FIG. 5A, the angle measurements are, as follows: $\theta^A=30°$, $\theta^B=120°$, $\theta^C=210°$, and $\theta^D=300°$, and by way of example, the difference between $\theta^B$ and $\theta^A$ is 90° (e.g., 120°−30°=90°). As shown in FIG. 5A and described above with FIGS. 4A-4D, there are an infinite number of polar coordinates for a given point, and as such, may have values such as $\theta^C=210°$ and −150°, and $\theta^D=300°$ and −60°.

Figure 5B:
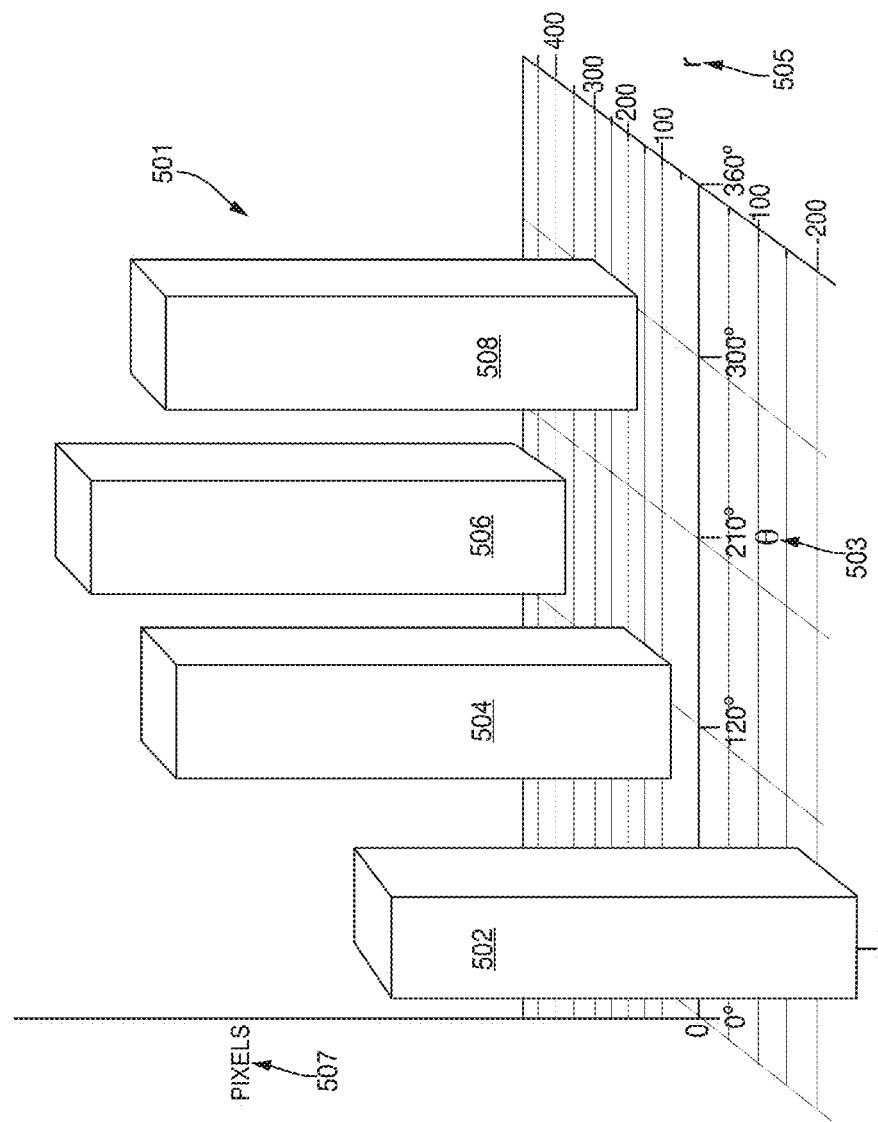
FIG. 5B illustrates an exemplary histogram for content item classification in accordance with some embodiments of the invention.

FIG. 5B illustrates an exemplary histogram for content item classification in accordance with some embodiments of the invention. A histogram is a graphical representation providing a visual impression of the distribution of observed data. Histogram 501 has dimensions for parameter ($\theta$) 503, parameter (r) 505, and pixels 507. As shown with histogram 501, there are clear peaks at edges (e.g., lines A 502 and B 504) of an object within the received image.

Figure 5C:
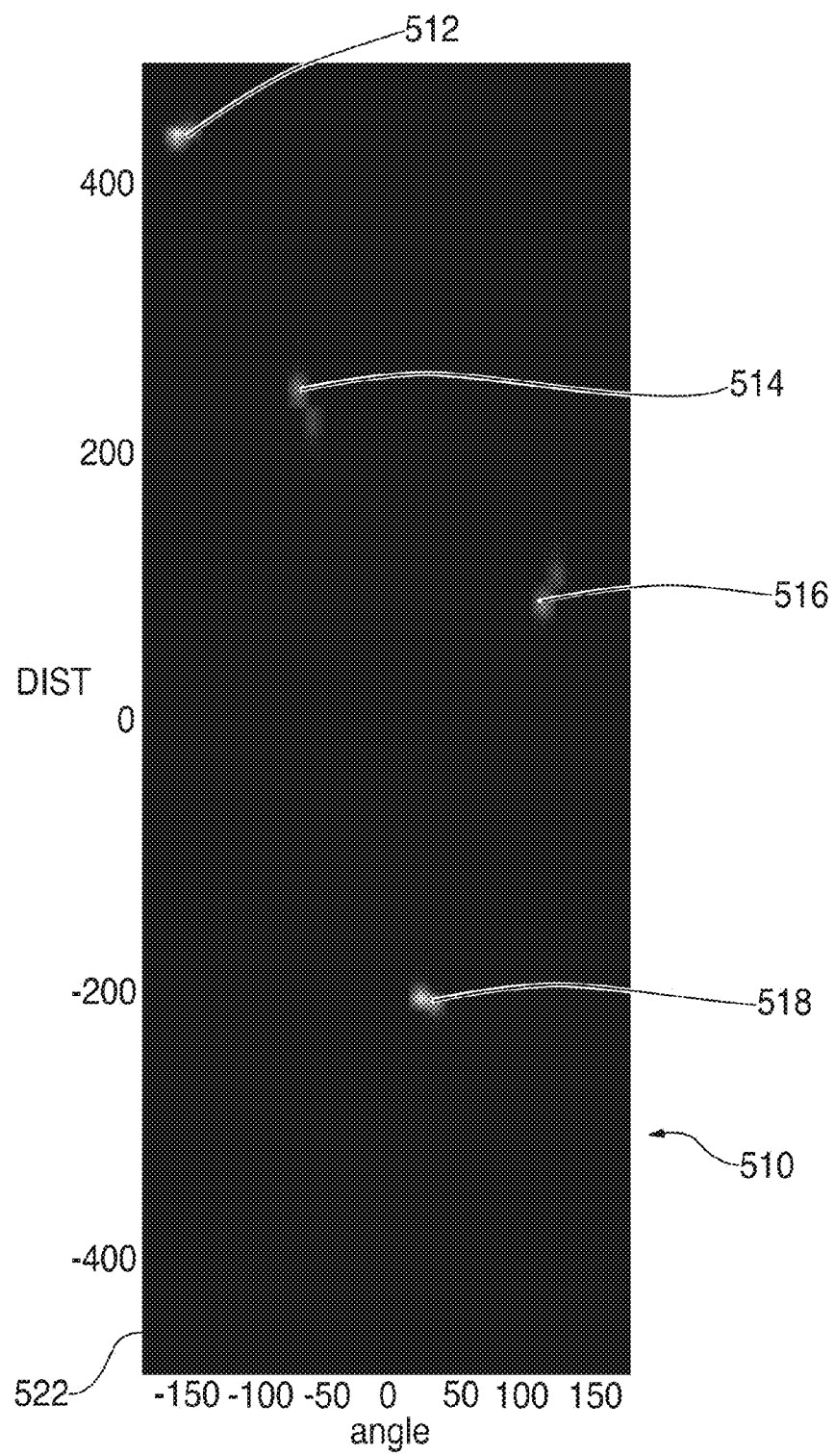
FIG. 5C depicts an exemplary raster image illustrating results of the Hough Transform for content item classification in accordance with some embodiments of the invention.

FIG. 5C illustrates an exemplary raster image with illustrative results of the Hough Transform for content item classification in accordance with some embodiments of the invention. As shown in raster image 510, has axes for parameter ($\theta$) 520, parameter (r) 522. In addition, higher cell values from the accumulator are illustrated with brighter spots at 512, 514, 516, and 518 for edges, C, D, A, and B, respectively.

After the edges of the potential object are determined, then the angle measurements may be used in combination with the compact representation values as inputs to an image classifier. The image may be classified with an image classifier that is trained to identify images that contain a document using values from the compact representation and the plurality of angle measurements (208). The image classifier may be a machine learning system that can learn from data and be trained to classify images using particular features. Any machine learning algorithm may be used to classify image including, but not limited to, the following algorithms: nearest neighbors, random forest, decision tree, association rule learning, artificial neural networks, genetic programming, inductive logic, support vector machines, clustering, Bayesian networks, reinforcement learning, representation learning, similarity learning, dictionary learning, and/or any other machine learning algorithm.

The image classifier may be a binary classifier with the task of classifying whether images contain a document or not. The image classifier may learn to classify images with a set of features indicative of the values for the compact representation of the image and the values of the plurality of angle measurements. In some embodiments, the angle measurements used by the image classifier may be normalized and the normalized values for the angles may be used to classify the image. For example, the following formulas may be used to normalize the angle measurements:

$$\alpha = \theta^A/90$$

$$\beta = (\theta^B - \theta^A)/90$$

$$\gamma = (\theta^C - \theta^B)/90$$

$$\delta = (\theta^D - \theta^C)/90.$$

The values for the compact representation and the normalized angle measurements may be concatenated together and provided as features to the image classifier. Continuing with the example values for angle measurements, the features may have values, as follows:

$$\alpha = 30°/90°,$$

$$\beta = (120° - 30°)/90°,$$

$$\gamma = (210° - 120°)/90°,$$

$$\delta = (300° - 210°)/90°.$$

The features may be used by the classifier to determine whether the image contains a document. In some embodiments, the features may be concatenated together in a vector, a string, and/or stored as any other datatype or within a particular data structure. If the image classifier determines that the image contains a document from the features, then the image may be further processed to rectify the image and classify the document, as will be discussed in more detail with FIG. 3.

Figure 3:
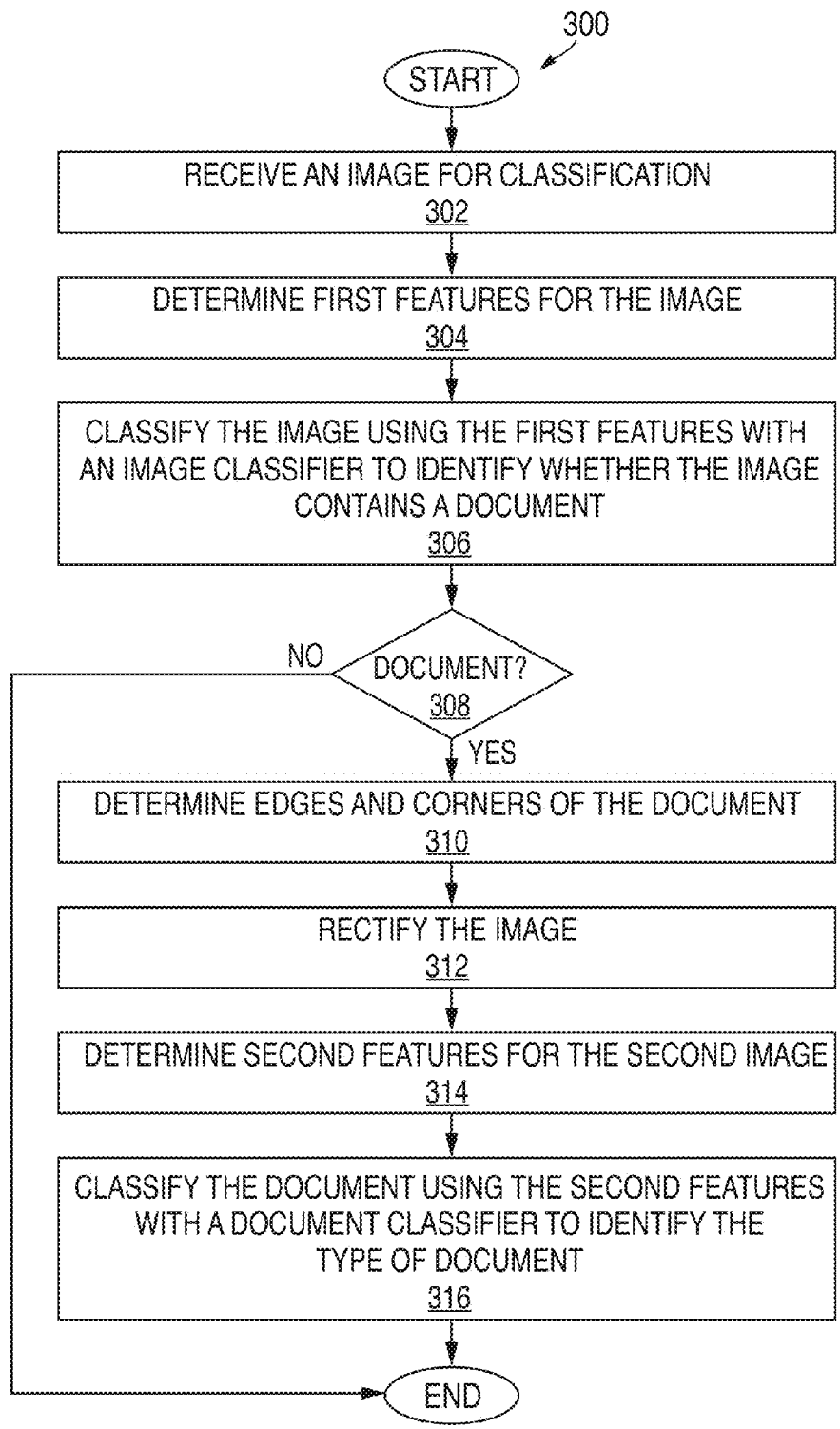
FIG. 3 is an exemplary flowchart for content item classification in accordance with some embodiments of the invention.

FIG. 3 depicts an exemplary flowchart 300 for image classification in accordance with some embodiments of the invention. An image may be received for classification (302). First features may be determined for the image (304). The first features may be indicative of the compact representation for the image and the angle measurements as described in detail with reference to FIG. 2. The image may be classified with an image classifier to identify whether or not the image contains a document (306). If a determination is made that the document does not contain a document (308), then the classification process may end.

Alternatively, if the image contains a document (308), then the edges and corners of the document may be determined (310). The edges within the image may be determined using any number of edge detection algorithms, including, but not limited to the following: Random Sample Consensus (RANSAC), search based, zero-crossing based, and/or any other algorithm for edge detection.

Figure 6:
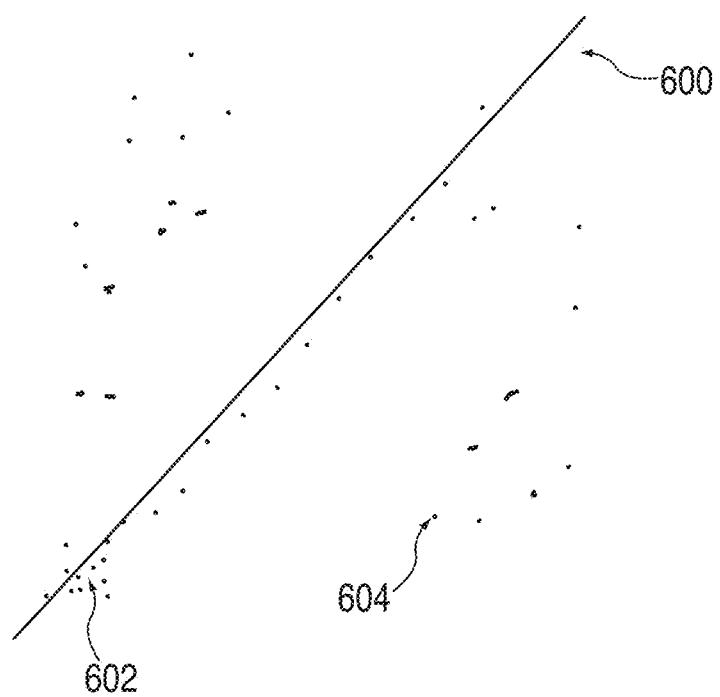
FIG. 6 illustrates an exemplary edge detection for content item classification in accordance with some embodiments of the invention.

To further detail this process, FIG. 6 illustrates exemplary edge detection for content item classification in accordance with some embodiments of the invention. Here a RANSAC iterative method was used to estimate an edge using observed data 604 and 602. RANSAC assumes that inlier data whose distribution can be explained by some set of model parameters (e.g., 602) may be subject to noise and outlier data that does not fit the model (e.g., 604). The outliers can come from extreme values for noise or from erroneous measurements or incorrect hypotheses. The observed data (e.g., edge point candidates) may be input to the RANSAC algorithm and an edge candidate line is iteratively fitted to hypothetical inliers from the data. If a sufficient number of inlier candidate edge points are fitted to the edge, then the edge is deemed an edge of the document.

Various heuristics may also be used to determine whether edge candidates identified are edges of the document and are not edges of other objects within the image. Multiple hypotheses for the location of the edges and/or corners of a potential document may be tested until the best candidates for the edges of the potential document are found. For example, with knowledge of the location of potential edges, the edges should intersect to form corners and edges that do not intersect as expected may be eliminated. If edges do not intersect to form corners and/or the edges do not intersect to form 90° or nearly 90° angles, then the edge candidates for a particular hypothesis may not be accurate.

Returning again to FIG. 3, the image may be rectified (312) to ensure that the document is clearly displayed. Rectification may include any technique and/or method to improve display of the image. The image may be cropped, tilted, transformed, and/or otherwise corrected during rectification. In particular, the image may be rectified to display the document as though it was scanned, and/or otherwise corrected for ease of display. For example, the portions of the image that are not part of image may be removed or cropped from the image. In another example, the image may be straightened, so that the text of the document can be read from left to right.

Next, second features may be determined for the image (314). The at least one potential document may be classified by a document classifier that is trained to identify a type of document using second features, including, for example, one or more of the following: (i) percentage of pixels within the image identified as forming an edge (ii) aspect ratio, (iii) sum of pixels identified as forming horizontal edges, and (iii) sum of pixels identified as forming vertical edges. An edge detector may be run on the image to determine edge points and the number of edge points may be used to classify the image. For example, a high number of edge points may indicate that there is a lot of text on the document as opposed to white space within the document, and a high percentage of text on the document relative to the area of the document may indicate a particular type of document. The amount of text on the document may allow for determination of the type of the document from other types of documents. By way of example, a particular document that has a high amount of text has a greater probability of being a menu than a business card. In another example, if there are a lower number of edge points relative to the area, then the document is more likely to be a business card.

Figure 7A:
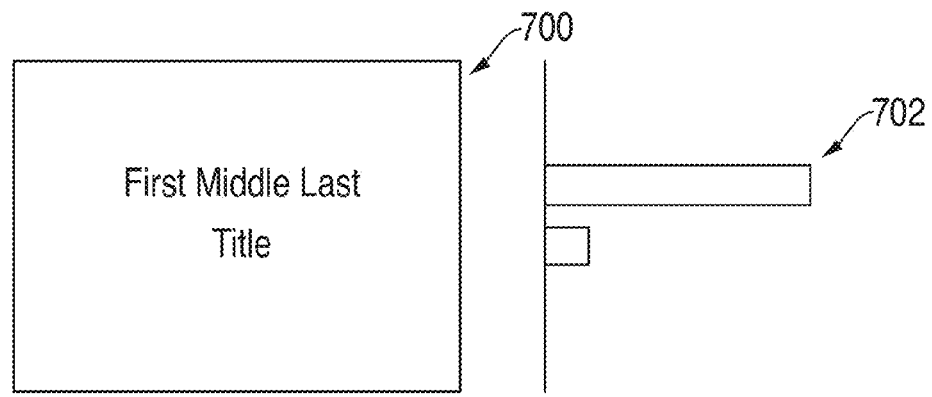
FIG. 7A illustrates exemplary features for content item classification in accordance with some embodiments of the invention.
Figure 7B:
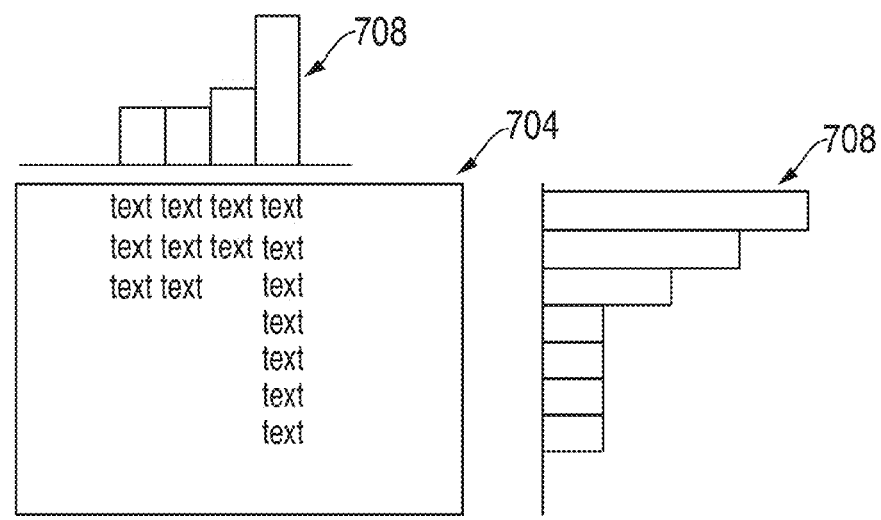
FIG. 7B illustrates exemplary features for content item classification in accordance with some embodiments of the invention.

FIG. 7A and FIG. 7B illustrate exemplary features that may be used for content item classification in accordance with some embodiments of the invention. FIGS. 7A and 7B illustrate histograms (e.g., 702 and 706) for horizontal sums of edge pixels for corresponding documents (e.g., 700 and 704). FIG. 7B illustrates a histogram for vertical sum of pixels (e.g., 708) for document 704. The sums of edge pixels may indicate concentrations of text within the document and the type of document may be deduced from the data. For example, as shown in FIG. 7A, a business card may have edge pixels concentrated in the center of the document. Whereas, as shown in FIG. 7B, a receipt may have edge pixels concentrated at the right and bottom of the document as illustrated in histograms 706 and 708.

Figure 7C:
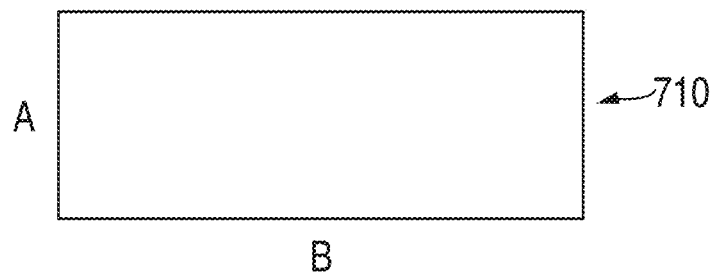
FIG. 7C illustrates exemplary features for content item classification in accordance with some embodiments of the invention.
Figure 7D:
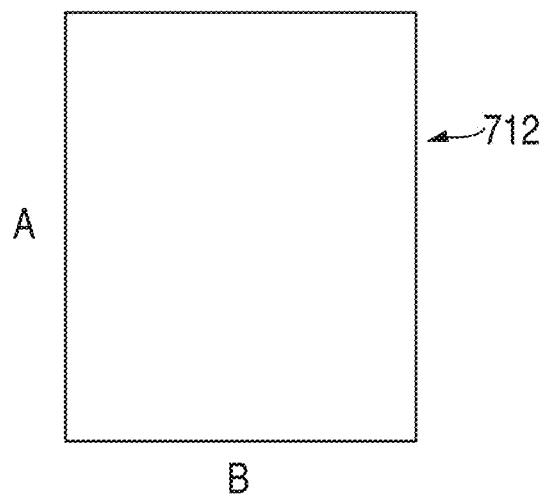
FIG. 7D illustrates exemplary features for content item classification in accordance with some embodiments of the invention.

FIG. 7C and FIG. 7D illustrate other exemplary features that may be used for content item classification in accordance with some embodiments of the invention. In particular, FIGS. 7C and 7D illustrate how aspect ratios can indicate the type of document within the image. For example, a business card may have a longer width (B) than height (A) as shown in 710 of FIG. 7C. Whereas, a receipt 712 may have greater height (A) than width (B).

Again with reference to FIG. 3, second features may be used by a document classifier to classify the document (316). Any machine learning algorithm may be used to classify the document. The document may be classified as a business card, a menu, a whiteboard image, a receipt, a check, a bill, a sign, and/or any other type of document. Optical character recognition may be performed to recognize text within the document and allow for indexing the document based upon the text contained in the document. Although low resolution images may be used in the classification of images and documents, an assumption may be made that the received image has a high enough resolution to recognize text within the document.

Exemplary Implementations

Any suitable programming language can be used to implement the routines of particular embodiments including, but not limited to, the following: C, C++, Java, JavaScript, Python, Ruby, CoffeeScript, assembly language, etc. Different programming techniques can be employed, such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for date and time handling thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for content item classification, comprising:
   receiving an image for classification;
   generating, using at least one processor, a compact representation for the image by downsampling the received image, the compact representation having a reduced set of pixel values indicative of pixel values within the received image;

identifying, using the at least one processor, a plurality of angle measurements for possible page edges of at least one potential document within the received image, wherein identifying the plurality of angle measurements for possible page edges comprises:
  calculating a plurality of gradient values from the reduced set of pixel values;
  identifying, based on the plurality of gradient values, one or more edge candidates of the at least one potential document; and
  calculating the plurality of angle measurements based on a vector extending from a selected origin to a point on each of the one or more edge candidates;
determining, based on the identified plurality of angle measurements, that the image contains a document; and
in response to determining that the image contains a document, classifying the image as a document containing image based on the identified plurality of angle measurements for possible page edges.

2. The method of claim 1, further comprising:
determining page edges and page corners for the at least one potential document and rectifying the at least one potential document; and
classifying the at least one potential document as to document type using at least one of a percentage of pixels within the image identified as forming a page edge, an aspect ratio, a sum of pixels identified as forming horizontal page edges or a sum of pixels identified as forming vertical page edges.

3. The method of claim 1, wherein identifying the plurality of angle measurements for possible page edges of the at least one potential document within the received image further comprises:
using one or more feature extraction techniques to identify the plurality of possible page edges.

4. The method of claim 3, wherein the one or more feature extraction techniques comprise a Hough transform.

5. The method of claim 2, wherein the document type is at least one of a business card, a menu, a check, or a receipt.

6. The method of claim 2, wherein the rectifying includes at least one of:
(1) correcting a tilt;
(2) correcting a slant;
(3) removing background image data; or
(4) performing perspective transformation.

7. The method of claim 2, wherein the page edges are determined using one or more edge detection methods.

8. The method of claim 2, further comprising:
performing optical character recognition.

9. A non-transitory computer readable medium containing instructions that, when executed by at least one processor of a computing device, cause the computing device to:
receive an image for classification;
generate a compact representation for the image by downsampling the received image, the compact representation having a reduced set of pixel values indicative of pixel values within the received image;
identify a plurality of angle measurements for possible page edges of at least one potential document within the received image, wherein identifying the plurality of angle measurements for possible page edges comprises:
  calculating a plurality of gradient values from the reduced set of pixel values;
  identifying, based on the plurality of gradient values, one or more edge candidates of the at least one potential document; and
  calculating the plurality of angle measurements based on a vector extending from a selected origin to a point on each of the one or more edge candidates;
determine, based on the identified plurality of angle measurements, that the image contains a document; and
in response to determining that the image contains a document, classify the image as a document containing image based on the identified plurality of angle measurements for possible page edges.

10. The non-transitory computer readable medium of claim 9, when executed by at least one processor of a computing device, further cause the computing device to:
determine page edges and page corners for the at least one potential document and rectifying the at least one potential document; and
classify the at least one potential document as to document type using at least one of a percentage of pixels within the image identified as forming a page edge, an aspect ratio, a sum of pixels identified as forming horizontal page edges or a sum of pixels identified as forming vertical page edges.

11. The non-transitory computer readable medium of claim 9, wherein identifying the plurality of angle measurements for possible page edges of the at least one potential document within the received image further comprises:
using one or more feature extraction techniques to identify the plurality of possible page edges.

12. The non-transitory computer readable medium of claim 11, wherein the or more feature extraction techniques comprise a Hough transform.

13. The non-transitory computer readable medium of claim 10, wherein the document type is at least one of a business card, a menu, a check, or a receipt.

14. The non-transitory computer readable medium of claim 9, wherein the rectifying includes at least one of:
(1) correcting a tilt;
(2) correcting a slant;
(3) removing background image data; or
(4) performing perspective transformation.

15. The non-transitory computer readable medium of claim 10, wherein the page edges are determined using one or more edge detection methods.

16. The non-transitory computer readable medium of claim 10, when executed by at least one processor of a computing device, further cause the computing device to:
perform optical character recognition.

17. A system for content item classification, the system comprising:
one or more processors; and
memory containing instructions that, when executed, cause one or more processors to:
  receive an image for classification;
  generate a compact representation for the image by downsampling the received image, the compact representation having a reduced set of pixel values indicative of pixel values within the received image;
  identifying a plurality of angle measurements for possible page edges of at least one potential document within the received image, wherein identifying the plurality of angle measurements for possible page edges comprises:
    calculating a plurality of gradient values from the reduced set of pixel values;
    identifying, based on the plurality of gradient values, one or more edge candidates of the at least one potential document; and calculating the plurality of angle measurements based on a vector extending from a selected origin to a point on each of the one or more edge candidates;

determine, based on the identified plurality of angle measurements, that the image contains a document; and in response to determining that the image contains a document, classify the image as a document containing image based on the identified plurality of angle measurements for possible page edges.

18. The method as recited in claim 1, further comprising converting the plurality of angle measurements to polar coordinates.

19. The method as recited in claim 18, further comprising determining, based on the polar coordinates, a location for each edge of the document within the image.

20. The non-transitory computer readable medium of claim 9, when executed by at least one processor of a computing device, further causing the computing device to convert the plurality of angle measurements to polar coordinates.

21. The non-transitory computer readable medium of claim 20, when executed by at least one processor of a computing device, further causing the computing device to determine, based on the polar coordinates, a location for each edge of the document within the image.

* * * * *